United States Patent [19]
Blaum et al.

[11] Patent Number: 5,386,420
[45] Date of Patent: Jan. 31, 1995

[54] CODING METHOD FOR CORRECTION AND DETECTION OF SKEWED TRANSITIONS IN PARALLEL ASYNCHRONOUS COMMUNICATION SYSTEMS

[75] Inventors: Miguel M. Blaum, San Jose; Jehoshua Bruck, Palo Alto, both of Calif.

[73] Assignee: International Business Machines Corporation, Armonk, N.Y.

[21] Appl. No.: 891,504

[22] Filed: May 29, 1992

[51] Int. Cl.$^6$ .................. H03M 13/00; H04L 7/04
[52] U.S. Cl. .................................. 371/1; 371/42
[58] Field of Search ..................... 371/1, 37.1, 42

[56] References Cited

U.S. PATENT DOCUMENTS 4,357,702 11/1982 Chase et al. .................... 371/1

OTHER PUBLICATIONS

T. Verhoeff, Delay-Insensitive Codes—An Overview, Distributed Computing, vol. 3, pp. 1–8, 1988.
Blaum et al., On t-Error Correcting/All Unidirectional Error Detecting Codes, IEEE Transactions on Computers, vol., C38, pp. 1493–1501, Nov. 1989.
Berger, A Note On Error Detection Codes For Asymetric Channels, Information and Control, vol. 4, pp. 68–73, 1961.

Primary Examiner—Stephen M. Baker
Attorney, Agent, or Firm—Henry E. Otto, Jr.

[57] ABSTRACT

A method and apparatus for encoding and decoding a $(t_1,t_2)$-skew-tolerant (ST) $(t_1+s_1,t_2+s_2)$-skew-detecting (SD) code, and for correcting and detecting skewed transitions in a parallel asynchronous communication system without acknowledgement, where $t_1$, $t_2$, $s_1$, and $s_2$ are selectable nonnegative integers. Even though transitions sent at the same time in parallel channels may arrive at different times, a limited degree of variation in transmission speeds is permitted between channels.

Assume $t_1$ is the maximum correctable number and $t_1+s_1$ the maximum detectable number of transitions that can be missing from a first transmitted codeword when the first transition arrives from a second transmitted codeword, and $t_2$ is the maximum correctable number and $t_2+s_2$ the maximum detectable number of transitions from the second codeword that can arrive before the last transition of the first codeword arrives. Errors will be corrected and transmissions will be continuous as long as the values of both $t_1$ and $t_2$, as preselected by the user, are not exceeded. If either $t_1$ or $t_2$ is exceeded, a desired control operation will generally be initiated. If the value of either $t_1$ or $t_2$ is exceeded, but the values of both $t_1+s_1$ and $t_2+s_2$ are not, then the control operation will always be successful in detecting skew.

13 Claims, 5 Drawing Sheets

CODING METHOD FOR CORRECTION AND DETECTION OF SKEWED TRANSITIONS IN PARALLEL ASYNCHRONOUS COMMUNICATION SYSTEMS

CROSS REFERENCE TO RELATED APPLICATIONS

[A] U.S. Ser. No. 07/715,524 filed Jun. 14 1991, entitled "Method and Apparatus for Encoding and Decoding Unordered Error Correcting Codes", now U.S. Pat. No. 5,285,454, issued Feb. 8, 1994;

[B] U.S. Ser. No. 07/715,279, filed Jun. 14, 1991, entitled "Coding Method for Skewed Transition Detection in Parallel Asynchronous Communication Systems", now U.S. Pat. No. 5,280,485, issued Jan. 18, 1994; and

[C] U.S. Ser. No. 07/715,522, filed Jun. 14, 1991, entitled "Coding Method for Skewed Transition Correction in Parallel Asynchronous Communication Systems", now U.S. Pat. No. 5,280,533, issued Jan. 18, 1994.

FIELD OF THE INVENTION

This invention relates to a method and apparatus for correcting up to a preselected number of skewed transitions in transmissions in parallel asynchronous communication systems and detecting up to a preselected greater number of skewed transitions when the first number is exceeded. The invention does not require acknowledgement signals being sent back to the transmitter or unduly long delay between transmissions and permits continuous pipeline operation so long as the first preselected number is not exceeded. When this first preselected number is exceeded, but not said greater number, an error detection protocol is invoked.

BACKGROUND OF THE INVENTION

If a communication system which consists of many parallel channels operates asynchronously and without acknowledgement, there is neither a clock signal received by the receiver nor an acknowledgement signal sent back to the transmitter upon completion of a transmission. Each transmission consists of one or more transitions (i.e., "1" bits) which are transmitted concurrently. If the information bits from different channels do not arrive at the same time (e.g., because of a delay in one or more of the channels), the receiver may receive some "1" bits corresponding to a next transmission before the present transmission has been completed, a condition referred to as "skew".

A paper by T. Verhoeff entitled "Delay-insensitive Codes—An Overview", published in Distributed Computing, Vol. 3, pp. 1-8, 1988, suggests the use in a parallel asynchronous communication system of unordered vectors because they are "delay insensitive". However, the parallel asynchronous communication system he describes requires that an acknowledgement signal be sent by the receiver to the transmitter upon completion of each transmission and he does not disclose or suggest the use of vectors with Hamming distance properties which are unordered.

The above-identified related application [A] describes improved unordered error correcting codes and a method and apparatus for encoding and decoding said codes that satisfies distance properties between codewords of the unordered codes and thereby permits correction of a preselected number of errors.

The above-identified related application [B] discloses a method for detecting (but not correcting) skewed transitions resulting from transitions from one transmission being intermixed with transitions of another transmission.

The above-identified related application [C] discloses a method for correcting (but not detecting more than the number correctable) skewed transitions resulting from transitions from one asynchronous transmission being intermixed with transitions of another asynchronous transmission.

Neither [A], [B], nor [C] discloses a method for correcting up to one predetermined number of skewed transitions in a parallel asynchronous communication system and detecting up to a preselected greater number of skewed transitions when said one number is exceeded.

To fully understand unordered codes, it is best to consider an example. For a binary vector u of length n, $u = u_1, u_2, \ldots, u_n$, and the set of nonzero bits of vector u are hereafter referred to as the "support" of u. For instance, for $n=6$, if $u=100101$, the support of u is the set $\{1,4,6\}$. Two vectors u and v of length n are considered unordered when their supports are unordered as sets; i.e., neither of them contains the other. Thus, $u=100101$ and $v=010101$ are unordered because their corresponding supports are $\{1,4,6\}$ and $\{2,4,6\}$. By contrast, the vector $w=000101$ which has a support of $\{4,6\}$ would not be unordered relative to either u or v because its support $\{4,6\}$ is a subset of the support of both u and v.

There is a need for a parallel asynchronous communication system which not only does not require acknowledgement between the receiver and transmitter when a transmission is completed, but also tolerates and corrects up to a preselected number of skewed transitions to permit continuous pipeline operation, and detects up to a preselected greater number of skewed transitions (and invokes an error detection protocol) when the first preselected number of skewed transitions is exceeded.

SUMMARY OF THE INVENTION

A method and apparatus are disclosed for encoding and decoding a $(t_1, t_2)$-skew-tolerant $(ST)(t_1+s_1, t_2+s_2)$-skew-detecting (SD) code, and for correcting and detecting skewed transitions in a parallel asynchronous communication system without acknowledgement, where $t_1, t_2, s_1$, and $s_2$ are selectable nonnegative integers. Even though transitions sent at the same time in parallel channels may arrive at different times, a limited degree of variation in transmission speeds is permitted between channels.

Assume $t_1$ is the maximum correctable number and $t_1 + s_1$ the maximum detectable number of transitions that may be missing from a first transmitted codeword when the first transition arrives from a second transmitted codeword, and $t_2$ is the maximum correctable number and $t_2 + s_2$ the maximum detectable number of transitions from the second codeword that may arrive before the last transition of the first codeword arrives. Errors will be corrected and transmissions will be continuous as long as the values of both $t_1$ and $t_2$, as preselected by the user, are not exceeded. If either $t_1$ or $t_2$ is exceeded, a desired control operation will generally be initiated. If the value of either $t_1$ or $t_2$ is exceeded, but not the values of both $t_1+s_1$ and $t_2+s_2$, then the control operation will always be successful in detecting skew.

The $(t_1,t_2)$-ST $(t_1+s_1,t_2+s_2)$-SD code is implemented by an encoder that selects codewords constituting a set in which at least one of the following criteria are met for any pair of codewords X and Y in the set:

(a) If $(t_1-t_2)(s_1-s_2) \geq 0$ and $N(X,Y) \leq N(Y,X)$, then at least one of the following three conditions occurs:
1. $N(X,Y) \geq \tau+1$;
2. $N(X,Y) \geq T+1$ and $N(Y,X) \geq \rho+1$; or
3. $N(X,Y) \geq 1$ and $N(X,Y) \geq t_1+t_2+S+1$; and (b) If $(t_1-t_2)(S_1-S_2) < 0$ and $N(X,Y) \leq N(Y,X)$, then at least one of the following four conditions occurs:
1. $N(X,Y) \geq \tau+1$;
2. $N(X,Y) \geq T+1$ and $N(Y,X) \geq \rho+1$;
3. $N(X,Y) \geq t+1$ and $N(Y,X) \geq t_1+t_2+s+1$; or
4. $N(X,Y) \geq 1$ and $N(Y,X) \geq t_1+t_2+S+1$;

where $t=\min\{t_1,t_2\}$, $T=\max\{t_1,t_2\}$, $s=\min\{s_1,s_2\}$, $S=\max\{s_1,s_2\}$, $\tau=\min\{t_1+s_1,t_2+s_2\}$, $\rho=\max\{t_1+s_1,t_2+s_2\}$, $N(X,Y)$ is the number of coordinates in which X is 1 and Y is 0, and $N(Y,X)$ is the number of coordinates in which Y is 1 and X is 0.

Implementation is simplified if $t_1=t_2=t$ and $s_1=s_2=s$.

DESCRIPTION OF THE PREFERRED EMBODIMENT

Figure 1:
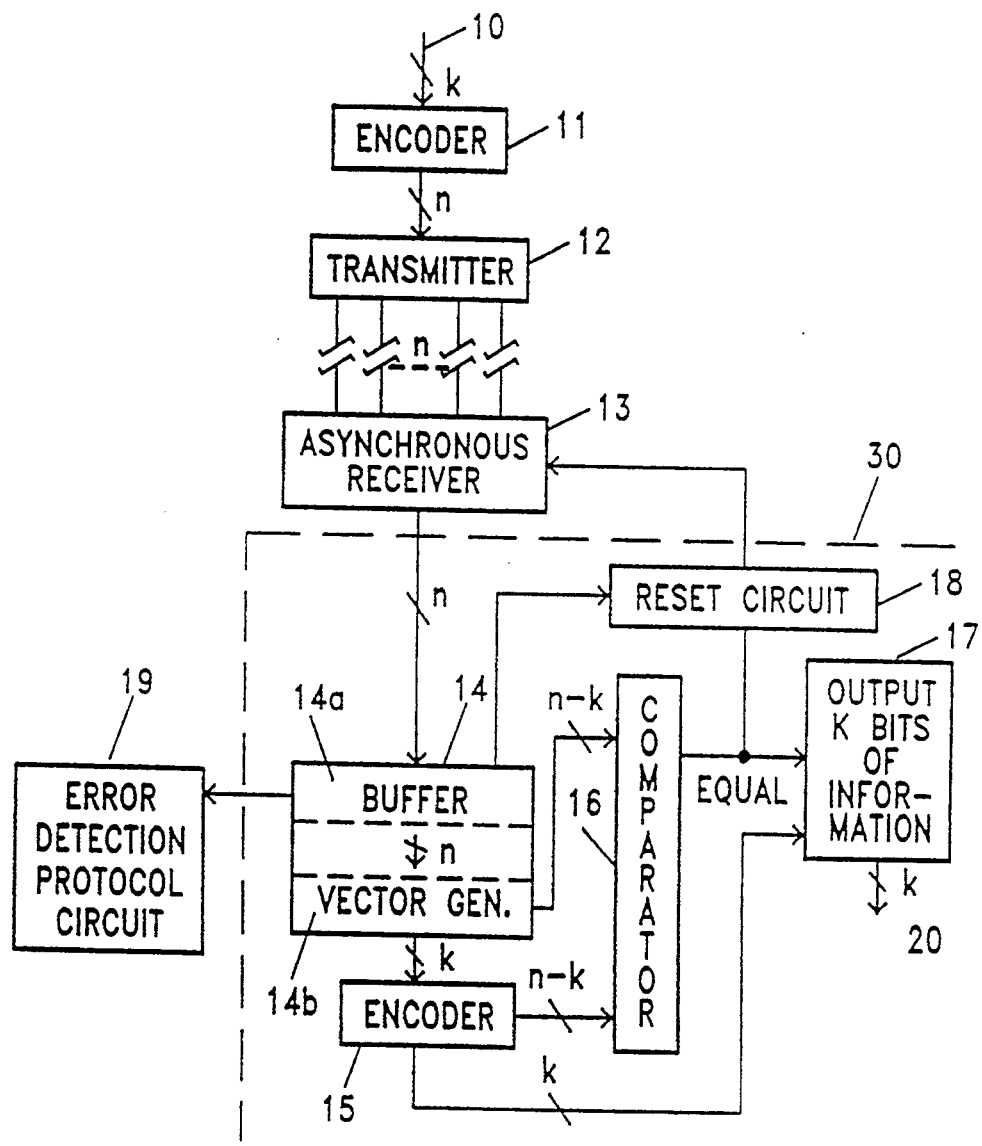
FIG. 1 depicts a parallel asynchronous communication system embodying the present invention.

FIG. 1 depicts a parallel asynchronous communication system for transmitting k information bits and a preselected number of redundant ECC bits, and a preselected number of "tail" bits. "Tail" bits are redundant bits, preferably minimum in number, which are added to each error correcting code (ECC) codeword to ensure that all ECC codewords are rendered unordered.

As shown in FIG. 1, k information bits are transmitted via a bus 10 to an encoder 11 and encoded by adding (n-k) redundancy bits to output an unordered ECC code of n bits to a transmitter 12. Transmitter 12 transmits the n-bit output from encoder 11 via n parallel channels to an asynchronous receiver 13. For each received transition, the asynchronous receiver 13 sends the n bits to a device, herein illustrated as set processor 14; however, if preferred, hard-wired circuitry may be substituted for the processor. Hence, the term "processor" is intended in the claims generically to cover implementation in either manner.

Figure 2:
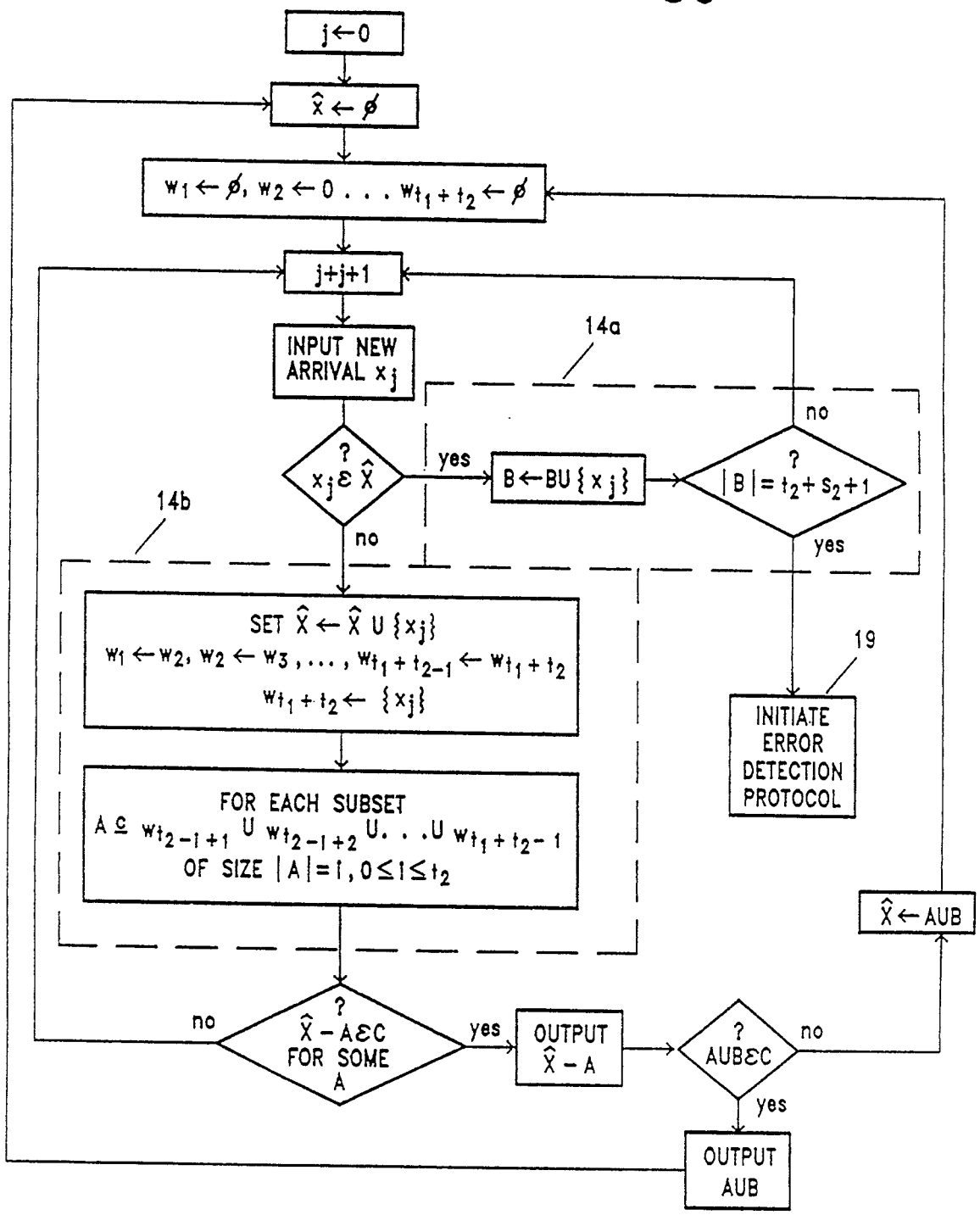
FIG. 2 is a flow chart depicting the series of operations performed by a decoder for implementing the invention.

A decoder 30 comprises the processor 14, an encoder 15, comparator 16, output gate circuit 17, and reset circuit 18. Set processor 14 generates sets of transitions (hereinafter referred to as sets A in FIG. 2) that arrive prior to the last transition of the current transmitted codeword. Set processor 14 also includes a buffer 14a which stores those arrived transitions which already are present in the then current received vector (hereinafter referred to as set B in FIG. 2 showing how applicants' decoding technique is implemented). Processor 14 also comprises a vector generator 14b that generates from each received vector several candidates for the current transmitted vector. If more than $t_1+s_1$ or $t_2+s_2$ repeated transitions occur and the storage capacity of the buffer 14a for set B in processor 14 is thus exceeded, a circuit 19 will generally initiate an error detection protocol because the $(t_1,t_2)$ constraints have been exceeded and the code is unable to correct the skew errors.

In the $(t_1,t_2)$-ST $(t_1+s_1,t_2+s_2)$-SD code, it is preferable for simplification that $t_1=t_2=t$ and $s_1=s_2=s$. However, as earlier noted, the values of $t_1,t_2,s_1$, and $s_2$ may be any nonnegative integers. It should also be noted that the skewed bits need not be consecutive; one or more bits may be interleaved so long as they in total do not exceed the selected values of either $t_1$ or $t_2$ for skew correction or of either $(t_1+s_1)$ or $(t_2+s_2)$ for skew detection.

The preferred embodiment, as hereinafter described in Example 1, is a (1,1) skew-tolerant, (2,2) skew-detecting code; i.e., $t_1,t_2,s_1$, and $s_2$ are each equal to 1. Hence, there are only two sets A: an empty set (denoted by $\emptyset$) and a set whose only element is the transition arriving prior to the last one. Each set A is subtracted from the current vector for each set A, and the first k bits of the remaining vectors are sent to encoder 15, which produces (n-k) bits for each of the remaining vectors. These (n-k) bits are sent to comparator 16.

Encoder 15 encodes these k bits into an unordered code that performs basically the same operation as encoder 11. Comparator 16 compares the n-k bits from set processor 14 with the n-k bits from encoder 15. If they are the same, circuit 17 gates the k information bits from encoder 15 to a bus 20 and triggers reset circuit 18 to take sets A and B from set processor 14, send the union of A and B (A∪B) to asynchronous receiver 13 as the first received vector, and reset B as the empty set.

According to the invention, the coding/decoding technique hereinafter described (1) does not require acknowledgement of a transmission, thereby enabling efficient asynchronous communication on a pipeline basis; and (2) corrects and detects skewed transitions, thereby accommodating up to a preselected amount of variation in channel transmission speeds.

Assume that a vector X is transmitted, followed by a vector Y. (It is expected that not many transitions from Y will arrive before the transmission of X has been completed.) Let $t_1$ represent the maximum correctable number and $t_1+s_1$ the maximum detectable number of transitions that may be present in X when a transition from Y arrives. Let $t_2$ represent the maximum correctable number and $t_2+s_2$ the maximum detectable number of transitions from Y that may arrive before the completion of X.

Given the two binary vectors X and Y of length n, let $N(X,Y)$ denote the number of corresponding coordinates in which X is 1 and Y is 0; for example, if $X=10110$ and $Y=00101$, and $n=5$, then $N(X,Y)=2$ and $N(Y,X)=1$. Note that $N(X,Y)+N(Y,X)=d_H(X,Y)$, where $d_H$ denotes the well-known Hamming distance (which for this example is 3).

Assume C is a code and that X and Y are codewords in C. Then code C will be $(t_1,t_2)$-ST $(t_1+s_1,t_2+s_2)$-SD if and only if one of the following occurs:

(a) If $(t_1-t_2)(s_1-s_2) \geq 0$ and $N(X,Y) \leq N(Y,X)$, then at least one of the following three conditions occurs:
 1. $N(X,Y) \geq \tau+1$;
 2. $N(X,Y) \geq T+1$ and $N(Y,X) \geq \rho+1$; or
 3. $N(X,Y) \geq 1$ and $N(Y,X) \geq t_1+t_2+S+1$; and (b) If $(t_1-t_2)(s_1-s_2) < 0$ and $N(X,Y) \leq N(Y,X)$, then at least one of the following four conditions occurs:
 1. $N(X,Y) \geq \tau+1$;
 2. $N(X,Y) \geq T+1$ and $N(Y,X) \geq \rho+1$;
 3. $N(X,Y) \geq t+1$ and $N(Y,X) \geq t_1+t_2+s+1$; or
 4. $N(X,Y) \geq 1$ and $N(Y,X) \geq t_1+t_2+S+1$;

where $t=\min\{t_1,t_2\}$, $T=\max\{t_1,t_2\}$, $s=\min\{s_1,s_2\}$, $S=\max\{s_1,s_2\}$, $\tau=\min\{t_1+s_1,t_2+s_2\}$, $\rho=\max\{t_1+s_1,t_2+s_2\}$, and $N(X,Y)$ is the number of coordinate which X is 1 and Y is 0.

To determine if a given code is $(t_1,t_2)$-ST $(t_1+s_1,t_2+s_2)$-SD, conditions (a) and (b) should be checked over all pairs of codewords. Use of global constructions, however, can often obviate the need of checking all possible pairs.

According to the invention, a preferred $(t_1,t_2)$-skew tolerant code can be constructed using a standard error correcting code (ECC) of sufficient word length to accommodate the number of information bits to be transmitted and having a sufficient minimum distance between each arbitrary pair of codewords to satisfy conditions (a) or (b) above.

If desired, however, a $(t_1,t_2)$-ST $(t_1+s_1,t_2+s_2)$-SD code may also be constructed using error correcting/all unidirectional error detecting (EC/AUED) codes, such as disclosed in a paper by Blaum and van Tilborg entitled "On t-Error Correcting/All Unidirectional Error Detecting Codes", published in IEEE Transactions on Computers, Vol. C-38, pp. 1493-1501, November 1989.

Encoding

The encoding technique preferably uses the method (but not the specific code) generically disclosed in the above-identified related application [A]. Therefore, it will not be described in detail. Encoder 11 may be of any conventional type for encoding the ECC codewords, provided the codewords satisfy the conditions of (a) or (b) above.

The encoder 15 for the preferred embodiment includes the circuits shown in FIGS. 3, 4, and 5 which are hereinbelow described in connection with Example 2.

Decoding

Before describing the decoding method embodying the invention, it is necessary to explain the system of notation that will hereinafter be used.

A plurality of n channels can be represented by the numbers 1,2, ..., n. When a message transmission begins, the signal levels in each of the n channels are subject to individual time delays. After the m-th transition has arrived, the receiver status is represented by the sequence $\hat{X}_m = x_1,x_2,...,x_m$ where $1 \leq x_i \leq n$, the number $x_i$ meaning that the i-th transition was received at the $x_i$-th track. The set $(x_1,x_2,...,x_m)$ will be designated as the "support" (i.e., the set of nonzero coordinates) of a vector that determines uniquely a binary vector. From now on, the sequence $\hat{X}_m = x_1,x_2,...,x_m$ will denote either the sequence as defined above, or a binary vector as defined by its support. Also, $\hat{X}$ may denote either a vector or its support; for example, if there are six tracks, labeled as 1,2,3,4,5,6 and the initial condition is presumed to be all zeros (i.e., no transitions received), the chronological representation of the six channels in arbitrary time units is as follows:

|  | 1 2 3 4 5 6 |
|---|---|
| INITIAL STATE | 0 0 0 0 0 0 |
|  | 0 = no one level received; initial condition |
| time 1 | 0 0 0 0 1 0 |
|  | current vector $\hat{X} = (5)$ |
| time 2 | 1 0 0 0 1 0 |
|  | current vector $\hat{X} = (5,1)$ |
| time 3 | 1 1 0 0 1 0 |
|  | current vector $\hat{X} = (5,1,2)$ |
| and so on. |  |

FIG. 2 is a flow chart setting forth the steps performed by decoder 30 in implementing applicants' novel method for successfully decoding X when skew does not exceed both of the two parameters $t_1$ and $t_2$, and detecting skew when it exceeds at least one of the parameters $t_1$ and $t_2$ but not both of the parameters $t_1+s_1$ and $t_2+s_2$. These steps may be expressed as follows:

Set the initial conditions $j \leftarrow 0$, $\hat{X} \leftarrow \emptyset$, $B \leftarrow \emptyset$ and $W_i \leftarrow \emptyset$, $1 \leq i \leq t_1+t_2$, START: Set $j \leftarrow j+1$.
If $x_j \in \hat{X}$, then set $B \leftarrow B \cup \{x_j\}$.
 If $|B| = t_2+s_2+1$, then declare an uncorrectable error and stop.
 Else, go to START.
Else, set $\hat{X} \leftarrow \hat{X} \cup \{x_j\}$, $W_i \leftarrow W_{i+1}$ for $1 \leq i \leq t_1+t_2-1$ and $W_{t_1+t_2} \leftarrow \{x_j\}$.
For each $A \subseteq W_{t_2-|A|+1} \cup W_{t_2-|A|+2} \cup ... \cup W_{t_1+t_2-1}$ of size $0 \leq |A| \leq t_2$, do:
 If $\hat{X} - A \in C$ for some A, then output $\hat{X} - A$.
 If $A \cup B \subset C$, then output $A \cup B$, set $\hat{X} \leftarrow \emptyset$, $W_i \leftarrow \emptyset$, $1 \leq i \leq t_1+t_2$, $B \leftarrow \emptyset$ and go to START.
 Else, set $\hat{X} \leftarrow A \cup B$, $W_i \leftarrow \emptyset$, $1 \leq i \leq t_1+t_2$, $B \leftarrow \emptyset$ and go to START.
Else, if $\hat{X} - A \notin C$ for any A, go to START.

The exact implementation of the decoding method depends on the specific code used. Normally, decoder 30 has to check whether a word or a subset thereof belongs to the code each time that a transition is received. Hence, basically the same circuit used for encoding can be used in the decoding.

EXAMPLE 1

This simplified example illustrates how the decoding method operates. Assume that C is a code whose only codewords are X=011111 and Y=110000, resulting in six parallel asynchronous channels. According to the above-defined condition (a), code C is (1,1)-ST (2,2)-SD.

Assume now that transmitter 12 (FIG. 1) sends the sequence:
 2, 3, 4, 5, 6, 1, 2
but that receiver 13 receives the sequence:

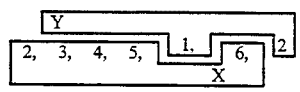

Applying the decoding technique step by step to each transition as it arrives, and assuming that i ranges from 0 to $t_2$ (i.e., from 0 to 1), it will be observed that for:
 Step 1: Sequence (2) corresponds to 010000, which is not in code C.

Step 2: Sequence (2,3) corresponds to 011000, and sequence (3) corresponds to 001000. Neither is in C.

Step 3: Sequence (2,3,4) corresponds to 011100 and sequence (2,4) corresponds to 010100. Neither is in C.

Step 4: Sequence (2,3,4,5) corresponds to 011110, and sequence (2,3,5) corresponds to 011010. Neither is in C.

Step 5: Sequence (2,3,4,5,1) corresponds to 111110, and sequence (2,3,4,1) corresponds to 111100. Again, neither is in C.

Step 6: Sequence (2,3,4,5,1,6) corresponds to 111111, which is not in C; but sequence (2,3,4,5,6) corresponds to 011111, which is in C. So output 011111 and store A, which is the 1 in sequence (2,3,4,5,1,6) as the new received sequence $X_1$.

Step 7: Sequence (1,2) corresponds to 110000, which is in C. Therefore, output 110000.

Assume now that the transmitter 12 sends the sequence:

2, 3, 4, 5, 6, 1, 2, 2, 3, 4, 5, 6 but receiver 13 receives the sequence:

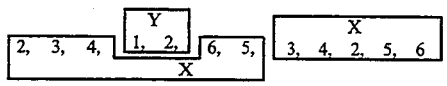

Applying the decoding method step by step as above, it will be observed that for:

Step 1: Sequence (2) corresponds to 010000, which is not in code C.

Step 2: Sequence (2,3) corresponds to 011000, and sequence (3) corresponds to 001000. Neither is in C.

Step 3: Sequence (2,3,4) corresponds to 011100 and sequence (2,4) corresponds to 010100. Neither is in C.

Step 4: Sequence (2,3,4,1) corresponds to 111100, and sequence (2,3,1) corresponds to 111000. Neither is in C.

Step 5: Sequence (2,3,4,1,2) has a repeated arrival, transition 2. It is stored as set B={2} in buffer 14a (FIG. 1).

Step 6: Both sequences (2,3,4,1,2,6) and (2,3,4,1,6) correspond to 111101, which is not in C.

Step 7: Sequence (2,3,4,1,2,6,5) corresponds to 111111 and sequence (2,3,4,1,2,5) corresponds to 111110. Neither is in C.

Step 8: Sequence (2,3,4,1,2,6,5,3) corresponds to 111111. Transition 3 gives a second repeated arrival. It is stored in set B={2,3} in buffer 14a (FIG. 1).

Step 9: Sequence (2,3,4,1,2,6,5,3,4) corresponds to 111111. Transition 4 gives a third repeated arrival. This activates circuit 19 to initiate the error detection protocol.

EXAMPLE 2

This example describes in more detail the encoding and decoding of a $(t_1,t_2)$-ST $(t_1+s_1,t_2+s_2)$-SD code. Assume seven parallel communication lines capable of transmitting 128 combinations of binary digits, each of word length of 7 bits. Obviously, enough information will have to be transmitted (in the form of redundancy) to ensure codeword arrival detection without acknowledgement and skew correction or detection.

In accordance with the invention, (a) the vector set must be modified by a minimum distance of $t_1+t_2+S+\max\{T,s\}+1$ between vectors, and then (b) the vectors must be made unordered so that one vector cannot be contained in another. To provide a (1,1)-ST (2,2)-SD code, a minimum distance of five is required between vectors. This can be achieved by concatenating eight additional bits to each original seven-bit word using the following technique.

For eight information bits, the ordinary structure of the binary word in sequence from least significant bit to most significant bits is:

$$\underset{(LSB)}{a_1}\ a_2\ a_3\ a_4\ a_5\ a_6\ \underset{(MSB)}{a_7}$$

While a number of error correcting codes may be used, the additional eight redundancy bits to be concatenated to each of the 128 seven-bit information words are determined using a standard (15,7) BCH code formulation as follows:

$a_8 = a_1 \oplus a_2 \oplus a_4$;
$a_9 = a_2 \oplus a_3 \oplus a_5$;
$a_{10} = a_3 \oplus a_4 \oplus a_6$;
$a_{11} = a_4 \oplus a_5 \oplus a_7$;
$a_{12} = a_1 \oplus a_2 \oplus a_4 \oplus a_5 \oplus a_6$;
$a_{13} = a_2 \oplus a_3 \oplus a_5 \oplus a_6 \oplus a_7$;
$a_{14} = a_1 \oplus a_2 \oplus a_3 \oplus a_6 \oplus a_7$;
$a_{15} = a_1 \oplus a_3 \oplus a_7$;

where $\oplus$ is the exclusive OR operator.

Figure 3:
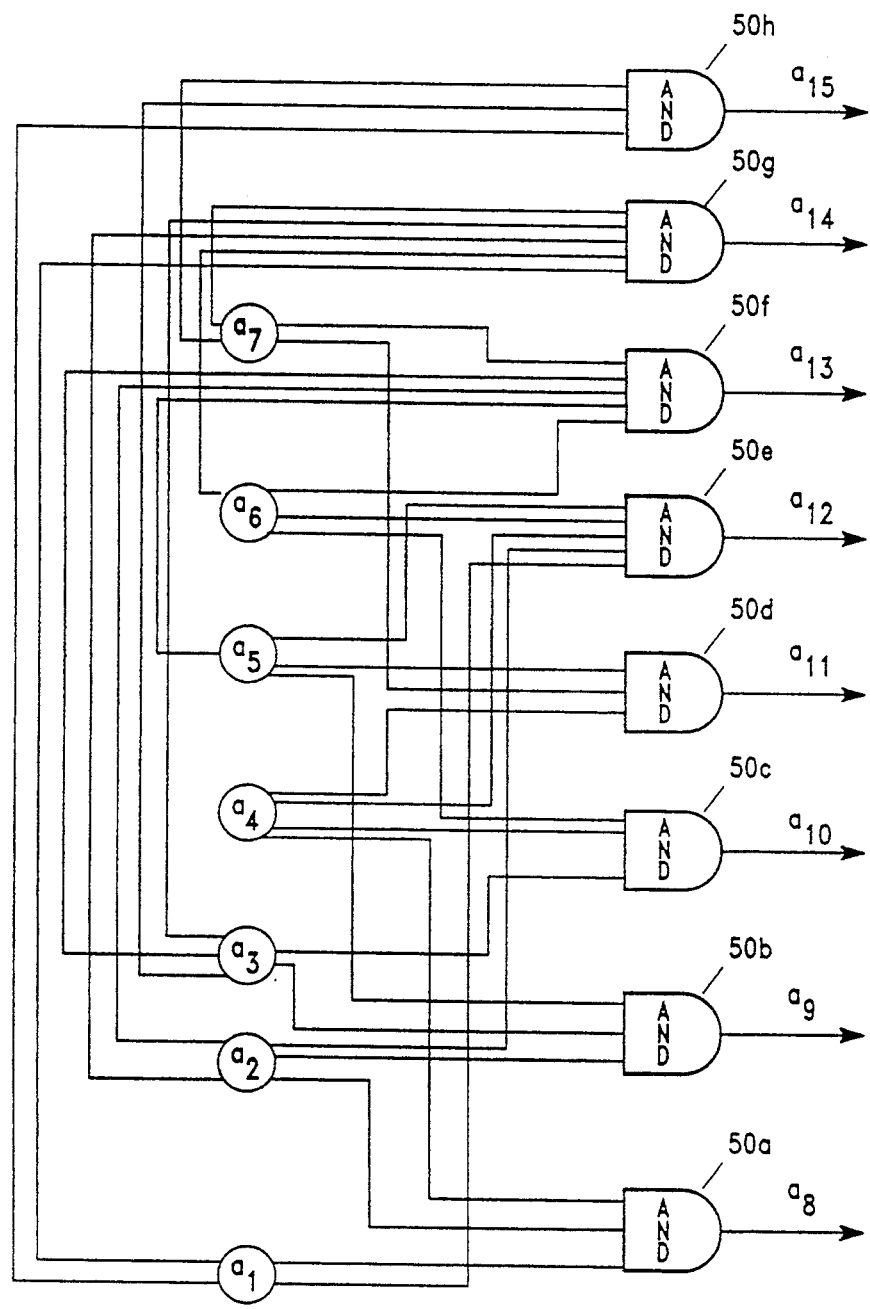
FIG. 3 is a schematic representation of a combinational logic circuit included in an encoder for implementing the preferred embodiment of the invention.
Figure 4:
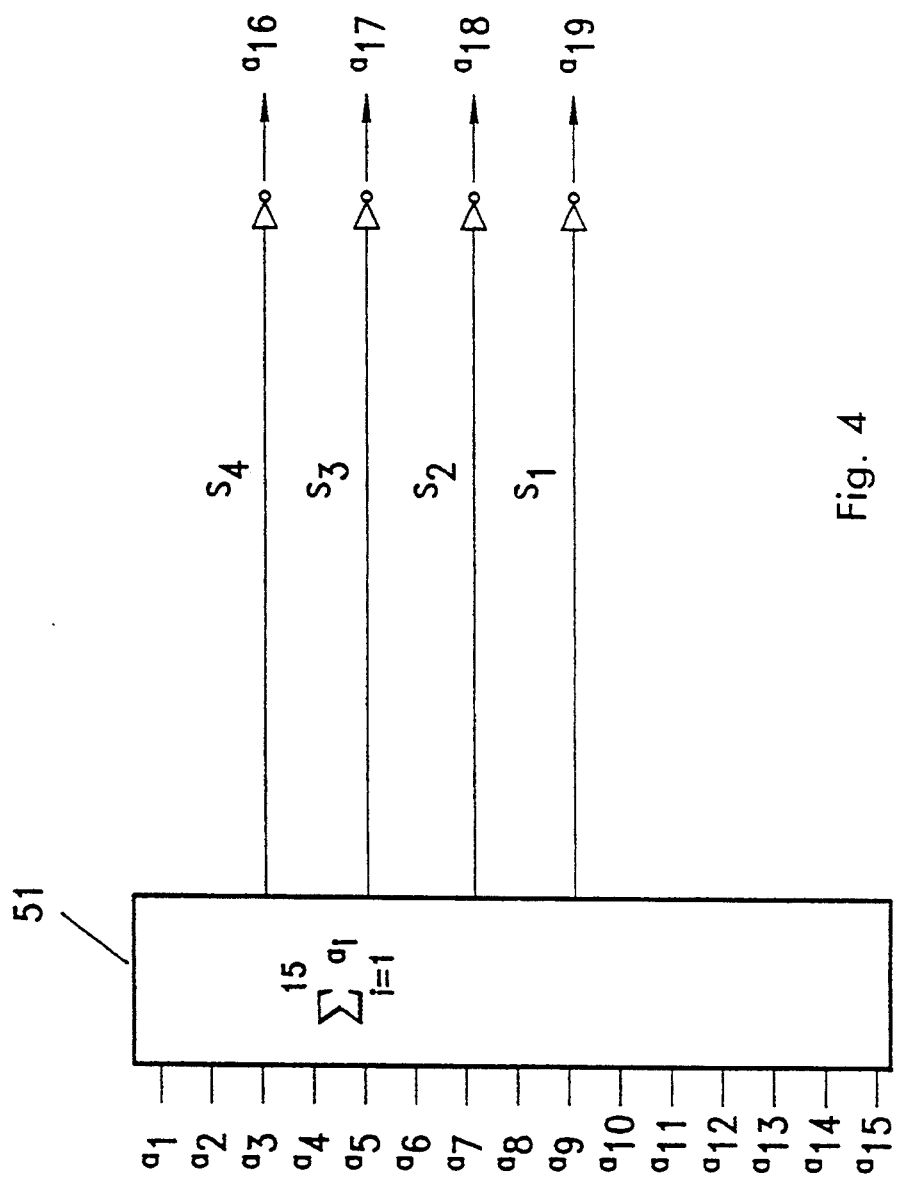
FIG. 4 depicts a logic circuit for an encoder according to one embodiment of the invention.

Encoder 15 comprises combinational logic circuit 15a which, as depicted in FIG. 3, comprises a plurality of AND gates 50a-50h to compute the functions for the bits $a_8$-$a_{15}$. Each new codeword now contains the original seven information bits and consists of 15 total bits, and each pair of codewords is at a Hamming distance of at least 5.

This (15,7) BCH code, however, without modification in accordance with the invention, cannot achieve the goals of parallel asynchronous communication skew detection without acknowledgment. The BCH codes used in a parallel communication arrangement are not capable of detecting or correcting bit skew.

According to an important feature of the invention, applicants have found that by unordering the (15,7) BCH code codewords or taking a subset of codewords within a code which are unordered, a suitable $(t_1,t_2)$-ST $(t_1+s_1,t_2+s_2)$-SD code can be constructed. Berger, in "A Note on Error Detection Codes for Asymmetric Channels", Information and Control, Vol. 4, pp. 68–73, 1961, has shown that the addition of a number of tail bits to fixed-weight codewords can produce unordered codewords. Following Berger's teaching and as shown in FIG. 4, with codewords having seven information bits $a_1$-$a_7$ and eight redundancy bits $a_8$-$a_{15}$ which provide a maximum weight of 15, four additional tail bits $s_1$-$s_4$ of information may be concatenated to produce unordered codewords using a function table or circuit 51. However, this will require $15+4=19$ parallel communication channels $a_1$-$a_{19}$.

Figure 5:
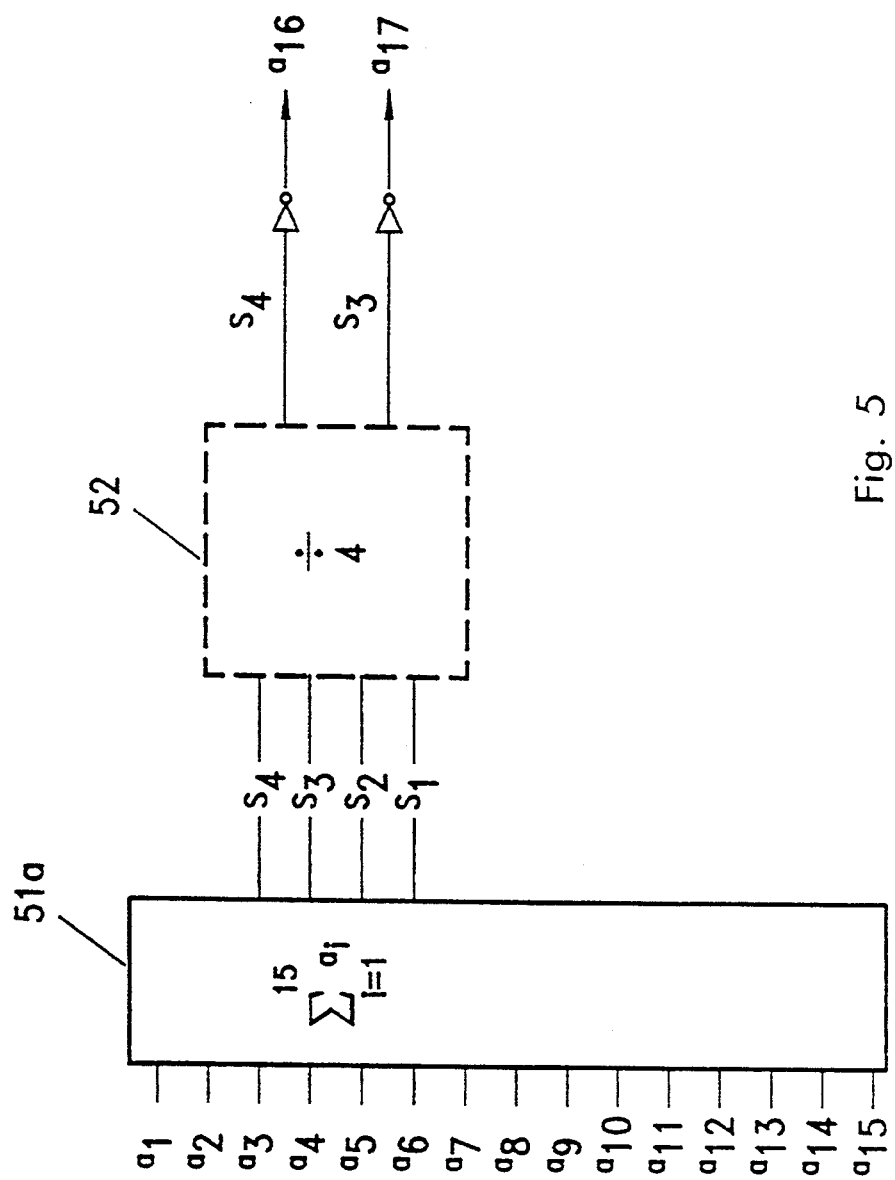
FIG. 5 depicts a modification of the encoder logic circuit of FIG. 4 according to a preferred embodiment of the invention.

Applicants have found that by using the encoder logic circuit implementation illustrated in FIG. 5, only two additional tail bits $s_3,s_4$ (as compared to the four when unordering by use of Berger's approach) need be concatenated to the seven information bits $a_1$-$a_7$ plus eight redundancy bits $a_8$-$a_{15}$ which form a vector with minimum distance d of four to produce, ultimately, a set of unordered vectors. This is achieved with a function table or circuit 51a and a divider circuit 52.

This reduction in tail bits is achieved by unordering the vectors by using an unordered error correcting code, such as disclosed in the above-identified related application [A]. This unordering may be achieved by considering a worst case; e.g., a (15,7) BCH code in which the number of weights is 16. The unordering is achieved by taking the number of zeros, dividing this number by 4, and writing it in binary. This is achieved by simply writing the number of zeros in binary and taking the two more significant bits.

Thus, the 128 vectors of total length 17, which contain the original seven information bits $a_1$–$a_7$, have a minimum distance of five and are unordered, and can be generated easily. The obtained code is (1,1)-ST (2,2)-SD.

EXAMPLE 3

This example implements applicants' invention in a system with 128 asynchronously transmitted 17-bit vectors in a parallel communication system.

```
        Channel Numbers
        1 2 3 4 5 6 7 8 9 10 11 12 13 14 15 16 17
    X = 1 0 1 1 0 1 1 0 1 1 0 1 1 0 1 0 1
    Y = 0 0 1 0 1 0 1 0 0 1 0 1 1 0 0 1 0
```

In other words, $X=\{1,3,4,6,7,9,10,12,13,15,17\}$ and $Y=\{3,5,7,10,12,13,16\}$.

Assume X is transmitted followed by Y over the 17 parallel lines and the received sequence is:

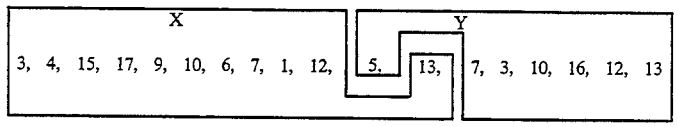

Let $x_1$–$x_{17}$ be the sequence in which the bits of the codeword arrive; that bits $a_1$–$a_7$ are information bits and bits $a_8$–$a_{17}$ are redundancy bits; and that $\hat{X}$ designates the vector currently stored in buffer 14a following the arrival of each bit sequence $x_1$–$x_{17}$. Now assume that the initial condition is all 0's; and that each step in the following tabulation represents the arrival of a transition.

```
                    x₁ arrives
                1 2 3 4 5 6 7 8 9 10 11 12 13 14 15
Step 1:         0 0 1 0 0 0 0 0 0 0 0 0 0 0 0
                This is the current X̂.
                a₈ = a₁ ⊕ a₂ ⊕ a₄ = 0;
                a₉ = a₂ ⊕ a₃ ⊕ a₅ = 1;
                a₁₀ = a₃ ⊕ a₄ ⊕ a₆ = 1;
                a₁₁ = a₄ ⊕ a₅ ⊕ a₇ = 1;
                a₁₂ = a₁ ⊕ a₂ ⊕ a₄ ⊕ a₅ ⊕ a₆ = 0;
                a₁₃ = a₂ ⊕ a₃ ⊕ a₅ ⊕ a₆ ⊕ a₇ = 1;
                a₁₄ = a₁ ⊕ a₂ ⊕ a₃ ⊕ a₆ ⊕ a₇ = 1;
                a₁₅ = a₁ ⊕ a₃ ⊕ a₇ = 1;
                a₁₆ = 0; and
                a₁₇ = 1.
                Decision NO; i.e., vector not in the code.
                    x₂ arrives
Step 2a:        0 0 1 1 0 0 0 0 0 0 0 0 0 0 0
                This is the current X̂.
                Since a₈ = 1, the decision is NO.
Step 2b:        0 0 0 1 0 0 0 0 0 0 0 0 0 0 0
                This is X̂ - {x₁}.
                Since a₈ = 1, the decision is NO.
                    x₃ arrives
Step 3a:        0 0 1 1 0 0 0 0 0 0 0 0 0 1 0 0
```

This is X̂.
Since $a_8 = 1$, the decision is NO.
Step 3b: 0 0 1 0 0 0 0 0 0 0 0 0 0 1 0 0
This is $\hat{X}$ - {$x_2$}.
Since $a_8 = 1$, the decision is NO.
        $x_4$ arrives
Step 4a: 0 0 1 1 0 0 0 0 0 0 0 0 0 1 0 1
This is X̂.
Since $a_8 = 1$, the decision is NO.
Step 4b: 0 0 1 1 0 0 0 0 0 0 0 0 0 0 0 1
This is $\hat{X}$ - {$x_3$}.
Since $a_8 = 1$, the decision is NO.
        $x_5$ arrives
Step 5a: 0 0 1 1 0 0 0 0 1 0 0 0 0 0 1 0 1
This is X̂.
Since $a_8 = 1$, the decision is NO.
Step 5b: 0 0 1 1 0 0 0 0 1 0 0 0 0 1 0 0
This is $\hat{X}$ - {$x_4$}.
Since $a_8 = 1$, the decision is NO.
        $x_6$ arrives
Step 6a: 0 0 1 1 0 0 0 0 1 1 0 0 0 0 1 0 1
This is X̂.
Since $a_8 = 1$, the decision is NO.
Step 6b: 0 0 1 1 0 0 0 0 0 1 0 0 0 0 1 0 1
This is $\hat{X}$ - {$x_5$}.
Since $a_8 = 1$, the decision is NO.
        $x_7$ arrives
Step 7a: 0 0 1 1 0 1 0 0 1 1 0 0 0 0 1 0 1
This is X̂.
Since $a_8 = 1$, the decision is NO.
Step 7b: 0 0 1 1 0 1 0 0 1 0 0 0 0 0 1 0 1
This is $\hat{X}$ - {$x_6$}.
Since $a_8 = 1$, the decision is NO.
        $x_8$ arrives
Step 8a: 0 0 1 1 0 1 1 0 1 1 0 0 0 0 1 0 1
This is X̂.
Since $a_8 = 1$, the decision is NO.
Step 8b: 0 0 1 1 0 0 1 0 1 1 0 0 0 0 1 0 1
This is $\hat{X}$ - {$x_7$}.
Since $a_8 = 1$, the decision is NO.
        $x_9$ arrives
Step 9a: 1 0 1 1 0 1 1 0 1 1 0 0 0 0 1 0 1
This is X̂.
Since $a_{13} = 1$, the decision is NO.
Step 9b: 1 0 1 1 0 1 0 0 1 1 0 0 0 0 1 0 1
This is $\hat{X}$ - {$x_8$}.
Since $a_{12} = 1$, the decision is NO.
        $x_{10}$ arrives
Step 10a: 1 0 1 1 0 1 1 0 1 1 0 1 0 0 1 0 1
This is X̂.
Since $a_{10} = 0$, the decision is NO.
Step 10b: 0 0 1 1 0 1 1 0 1 1 0 1 0 0 1 0 1
This is $\hat{X}$ - {$x_9$}.
Since $a_8 = 1$, the decision is NO.
        $x_{11}$ arrives
Step 11a: 1 0 1 1 1 1 1 0 1 1 0 1 0 0 1 0 1
This is X̂.
Since $a_9 = 0$, the decision is NO.
Step 11b: 1 0 1 1 1 1 1 0 1 1 0 0 0 0 1 0 1
This is $\hat{X}$ - {$x_{10}$}.
Since $a_9 = 0$, the decision is NO.
        $x_{12}$ arrives
Step 12a: 1 0 1 1 1 1 1 0 1 1 0 1 1 0 1 0 1
This is X̂.
Since $a_9 = 0$, the decision is NO.
Step 12b: 1 0 1 1 0 1 1 0 1 1 0 1 1 0 1 0 1
This is $\hat{X}$ - {$x_{11}$}.
Since $a_8 = 0$; $a_9 = 1$; $a_{10} = 1$; $a_{11} = 0$; $a_{12} = 1$; $a_{13} = 1$; $a_{14} = 0$; $a_{15} = 1$; $a_{16} = 0$; and $a_{17} = 1$, the decision is YES and the output 1011011 on bus 20 is the information part of $\hat{X}$.

Now reset the received sequence to (5,7,3,10,16,12,13). Repeat the process and arrival decoding for Y.

Note again the received sequence

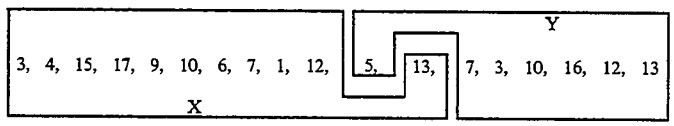

In summary, it will now be apparent that if $t_1$ is the maximum correctable number and $t_1+s_1$ the maximum detectable number of transitions that may be missing from a first transmitted codeword when the first transition arrives from a second transmitted codeword, and $t_2$ is the maximum correctable number and $t_2+s_2$ the maximum detectable number of transitions from the second codeword that may arrive before the last transition of the first codeword arrives, errors will be corrected and transmissions will be continuous as long as the values of both $t_1$ and $t_2$, as preselected by the user, are not exceeded. If either $t_1$ or $t_2$ is exceeded, a desired control operation will generally be initiated. If the value of either $t_1$ or $t_2$ is exceeded, but not the values of both $t_1+s_1$ and $t_2+s_2$, then the control operation will always be successful in detecting skew.

While the invention has been particularly shown and described with reference to a preferred embodiment thereof, it will be understood by those skilled in the art that various changes in form and details may be made therein without departing from the spirit and scope of the invention. Accordingly, the method and apparatus herein disclosed are to be considered merely as illustrative and the invention is to be limited only as specified in the claims.

We claim:

1. A method of encoding to produce sets of codewords from sequences of digital electrical signals for asynchronous transmission over parallel communication channels without requiring acknowledgement of completion of each transmitted codeword, comprising the steps of:

from four selectable non-negative integers $t_1$, $t_2$, $s_1$, $s_2$, selecting $t_1$ as a maximum correctable number and $t_1+s_1$ as a maximum detectable number of transitions that can be missing from a first transmitted codeword when a transition from a second transmitted codeword arrives, and selecting $t_2$ as a maximum correctable number and $t_2+s_2$ as a maximum detectable number of transitions which can arrive from the second transmitted codeword before all of the transitions of the first transmitted codeword arrive;

using an encoder and a standard error correcting code (ECC), constructing ECC codewords of a word length sufficient to accommodate all information bits to be transmitted and having a minimum distance between any pair of ECC codewords of $t_1+t_2+S+\max\{T,s\}+1$, where $S=\max\{s_1,s_2\}$ and $T=\max\{t_1,t_2\}$ and $s=\min\{s_1,s_2\}$; and using said encoder, unordering the ECC codewords by concatenating additional redundancy bits of a number sufficient that no resulting ECC codeword can be contained in another codeword in the code, said ECC codewords being capable of correcting up to $t_1$ or $t_2$, and detecting up to $t_1+s_1$ or $t_2+s_2$, skewed transitions that result from mixing of transitions from codewords transmitted in sequence.

2. The method of claim 1, wherein the unordering step includes the steps of:

determining the weight of each of the ECC codewords;

expressing that weight in a binary representation; and complementing the binary representation to produce said additional redundancy bits.

3. The method of claim 1, wherein the step of unordering includes the steps of:

using a combinational logic circuit, determining the weight of each of the ECC codewords;

using a divider circuit, dividing said weight by the quantity $(t_1+t_2+S+\max\{T,s\}+1)$ and generating the integer part thereof in binary representation; and using inverter circuitry, complementing the binary representation to produce said additional redundancy bits.

4. The method of claim 1, wherein the values of $s_1$ and $s_2$ are zero and the ECC codewords merely correct up to $t_1$ and $t_2$ skewed transitions.

5. The method of claim 1, wherein the sets of transmitted codewords have a length and are constructed by the steps of:

using $N(X,Y)$ to denote the number of coordinates in which X is 1 and Y is 0 and using $N(Y,X)$ to denote the number of coordinates in which Y is 1 and X is 0; and encoding the sequences of digital signals into a set of transmitted codewords in which one of the following criteria is met for all pairs of transmitted codewords X and Y in each said set:

(a) if $(t_1-t_2)(s_1-s_2) \geq 0$ and $N(X,Y) \leq N(Y,X)$, then at least one of the following three conditions occurs:
  1. $N(X,Y) \geq \tau+1$;
  2. $N(X,Y) \geq T+1$ and $N(Y,X) \geq \rho+1$; or
  3. $N(X,Y) \geq 1$ and $N(Y,X) \geq t_1+t_2+S+1$; whereas if $(t_1-t_2)(s_1-s_2) < 0$ and $N(X,Y) \leq N(Y,X)$, then at least one of the following four conditions occurs:
  1. $N(X,Y) \geq \tau+1$;
  2. $N(X,Y) \geq T+1$ and $N(Y,X) \geq \rho+1$;
  3. $N(X,Y) \geq t+1$ and $N(Y,X) \geq t_1+t_2+s+1$; or
  4. $N(X,Y) \geq 1$ and $N(Y,X) \geq t_1+t_2+S+1$;

where $t=\min\{t_1,t_2\}$, $\tau=\min\{t_1+s_1,t_2+s_2\}$, and $\rho=\max\{t_1+s_1,t_2+s_2\}$.

6. A $(t_1,t_2)$-skew-tolerant $(t_1+s_1,t_2+s_2)$-skew,detecting code constructed by the method of claim 5.

7. The method of claim 5, including initiating a desired control protocol when the number of skewed transitions exceeds $t_1$ or $t_2$ provided the number of skewed transitions does not exceed $t_1+s_1$ and $t_2+s_2$.

8. A method of correcting and detecting skewed transitions in codewords transmitted asynchronously as sequences of digital electrical signals over parallel information communication channels without acknowledgement of completion of each transmission, comprising the steps of:

from four selectable nonnegative integers $t_1$, $t_2$, $s_1$, $s_2$, selecting $t_1$ as a maximum correctable number, and $t_1+s_1$ as a maximum detectable number, of transitions that can be missing from a first transmitted codeword when a transition from a second transmitted codeword arrives, and selecting $t_2$ as a maximum correctable number, and $t_2+s_2$ as a maximum detectable number, of transitions which can arrive from the second transmitted codeword before all of the transitions of the first transmitted codeword arrive;

using $N(X,Y)$ to denote the number of coordinates in which X is 1 and Y is 0, and $N(Y,X)$ to denote the number of coordinates in which Y is 1 and X is 0;

using an encoder, creating a $(t_1,t_2)$-skew-correcting $(t_1+s_1,t_2+s_2)$-skew-detecting code by encoding codewords constituting sets in which one of the following criteria is met for all pairs of codewords X and Y in the set, assuming $N(X,Y) \leq N(Y,X)$:

(a) if $(t_1-t_2)(s_1-s_2) \geq 0$, then at least one of the following three conditions occurs:
  1. $N(X,Y) \geq \tau+1$;
  2. $N(X,Y) \geq T+1$ and $N(Y,X) \geq \rho+1$; or
  3. $N(X,Y) \geq 1$ and $N(Y,X) \geq t_1+t_2+S+1$; and (b) if $(t_1-t_2)(s_1-s_2) < 0$, then at least one of the following four conditions occurs:
  1. $N(X,Y) \geq \tau+1$;
  2. $N(X,Y) \geq T+1$ and $N(Y,X) \geq \tau+1$;
  3. $N(X,Y) \geq t+1$ and $N(Y,X) \geq t_1+t_2+s+1$; or
  4. $N(X,Y) \geq 1$ and $N(Y,X) \geq t_1+t_2+S+1$;

where $t=\min\{t_1,t_2\}$, $T=\max\{t_1,t_2\}$, $s=\min\{s_1,s_2\}$, $S=\max\{s_1,s_2\}$, $\tau=\min\{t_1+s_1,t_2+s_2\}$, $\rho=\max\{t_1+s_1,t_2+s_2\}$; and correcting, with a processor, skewed transitions as long as the values of $t_1$ and $t_2$ are not exceeded; and detecting with said processor skewed transitions when the value of either $t_1$ or $t_2$ is exceeded but the values of $t_1+s_1$ and $t_2+s_2$ are not exceeded.

9. In an information communication system wherein digital electrical signals are transmitted asynchronously in sequences and no acknowledgement of sequence completion is required, a method of decoding vectors containing error-free information represented by said signals and capable of detecting and correcting skewed transitions which mix the information from codewords transmitted in sequence, comprising the steps of:

(a) with an asynchronous receiver, receiving one vector having information bits and redundancy bits resulting from a transition received on any of n parallel channels;

(b) using a set processor, generating a first set of vectors from subsets of said one vector and removing from each vector in said first set all redundancy bits to provide an estimate of information bits;

(c) using an encoder, encoding and unordering all bits remaining after the redundancy bits have been removed from each vector of said first set to create a second set of vectors corresponding to the vectors of said first set;

(d) using a comparator, comparing each vector of said first set with a corresponding vector of said second set; and (e) using a gate circuit conditioned when one of the vectors of the first set is the same as its corresponding vector in the second set for outputting information bits corresponding to said one vector in said first set.

10. The method of claim 9, including repeating steps (b)-(e) for each said one vector received in successive steps (a).

11. An apparatus employing parallel asynchronous communication for transmitting codewords over parallel channels from a transmitter to a receiver without acknowledgement of transmission completion, comprising:

(i) an encoder for constructing a set of codewords such that, for $t=\min\{t_1,t_2\}$, $T=\max\{t_1,t_2\}$, $s=\min\{s_1,s_2\}$, $S=\max\{s_1,s_2\}$, $\tau=\min\{t_1+s_1,t_2+s_2\}$, and $\rho=\max\{t_1+s_1,t_2+s_2\}$, one of the following criteria is met for all pairs of codewords X and Y, assuming $N(X,Y) \leq N(Y,X)$ in the set, where $N(X,Y)$ denotes the number of coordinates in which X is 1 and Y is 0, and $N(Y,X)$ denotes the number of coordinates in which Y is 1 and X is 0:

(a) if $(t_1-t_2)(s_1-s_2) \geq 0$, then at least one of the following three conditions occurs:
  1. $N(X,Y) \geq \tau+1$;
  2. $N(X,Y) \geq T+1$ and $N(Y,X) \geq \rho+1$; or
  3. $N(X,Y) \geq 1$ and $N(Y,X) \geq t_1+t_2+S+1$;
  whereas (b) if $(t_1-t_2)(s_1-s_2) < 0$, then at least one of the following four conditions occurs:
  1. $N(X,Y) \geq \tau+1$;
  2. $N(X,Y) \geq T+1$ and $N(Y,X) \geq \rho+1$;
  3. $N(X,Y) \geq t+1$ and $N(Y,X) \geq t_1+t_2+s+1$; or
  4. $N(X,Y) \geq 1$ and $N(Y,X) \geq t_1+t_2+S+1$;

where $t_1$, $t_2$, $s_1$, and $s_2$ are selectable nonnegative integers, $t_1$ is a preselected maximum correctable number and $t_1+s_1$ is a preselected maximum detectable number of transitions that can be missing from a first transmitted codeword when a transition from a second transmitted codeword arrives, $t_2$ is a preselected maximum correctable number and $t_2+s_2$ is a preselected maximum detectable number of transitions that can arrive from the second transmitted codeword before all the transitions of the first transmitted codeword arrive; and (ii) a decoder for decoding said codewords upon reception and (a) correcting up to one preselected number of skewed transitions in codewords transmitted in sequence when both $t_1$ and $t_2$ are not exceeded, and (b) detecting up to another preselected number of skewed transitions when said one preselected number of skewed transitions has been exceeded but both $t_1+s_1$ and $t_2+s_2$ are not exceeded.

12. The apparatus of claim 11, including means operative if the number of skewed transitions exceeds the value of either $t_1$ or $t_2$ to initiate a desired control operation.

13. In a system for transmitting codewords in the form of sequences of digital electrical signals asynchronously over n parallel communication channels without requiring acknowledgement of completion of transmission of each sequence, decoding apparatus capable of detecting and correcting skewed transitions which mix signals from codewords transmitted in sequence, comprising:

means for generating a first set of vectors from subsets of a vector having information bits and redundancy bits resulting from a transition received on any of said n parallel channels;

means for removing from each vector in said first set all redundancy bits to provide an estimate of information bits;

means for reencoding the bits remaining after the redundancy bits have been removed from each vector of said first set to create a second set of vectors corresponding to those of said first set;

means for unordering said reencoded remaining bits;

means for comparing each vector of said first set with a corresponding vector of said second set; and means for outputting information bits corresponding to one of the vectors in said first set if and when it is the same as its corresponding vector in the second set.

* * * * *

UNITED STATES PATENT AND TRADEMARK OFFICE
CERTIFICATE OF CORRECTION

PATENT NO. : 5,386,420
DATED : Jan. 31, 1995
INVENTOR(S) : Miguel M. Blaum; Jehoshua Bruck It is certified that error appears in the above-identified patent and that said Letters Patent is hereby corrected as shown below:

Column 12, line 34: after "length" insert --n--

Column 12, line 49: before "if" insert --(b)--

Column 13, line 28: change "τ" (the Greek letter tau) to --ρ-- (the Greek letter rho)

Signed and Sealed this

Twelfth Day of December, 1995

Attest:

BRUCE LEHMAN

*Attesting Officer*  *Commissioner of Patents and Trademarks*